March 10, 1970  L. E. BROBERG  3,499,556
HYDRAULIC UNLOADING MECHANISM FOR A STORAGE STRUCTURE
Filed July 3, 1967  2 Sheets-Sheet 1
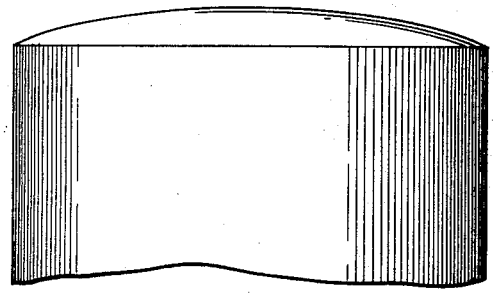
Fig. 1
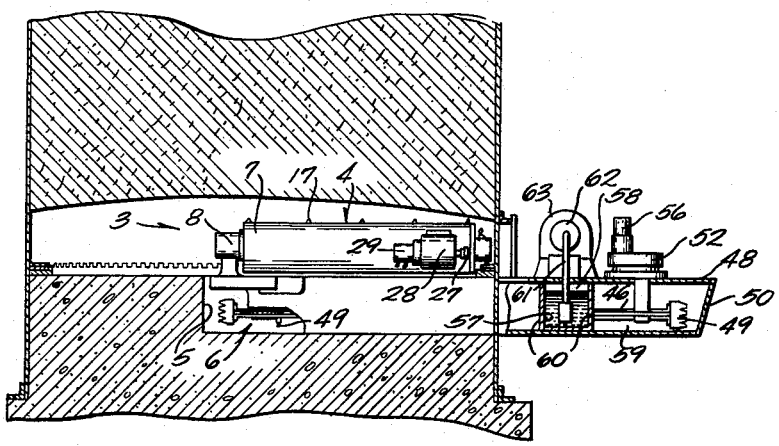
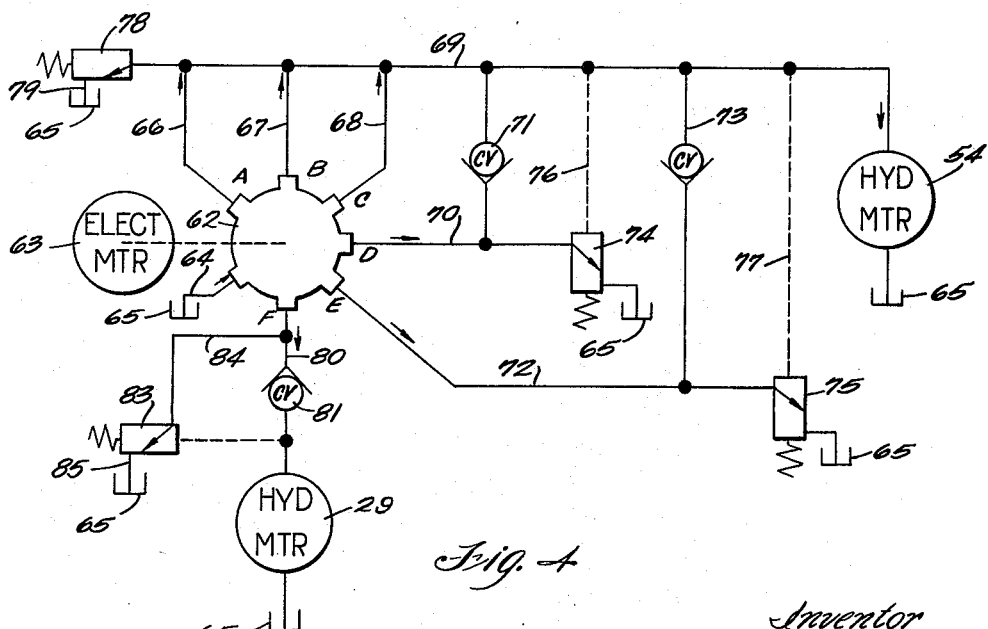
Fig. 4
Inventor
Leonard E. Broberg
By Andrus & Starke
Attorneys

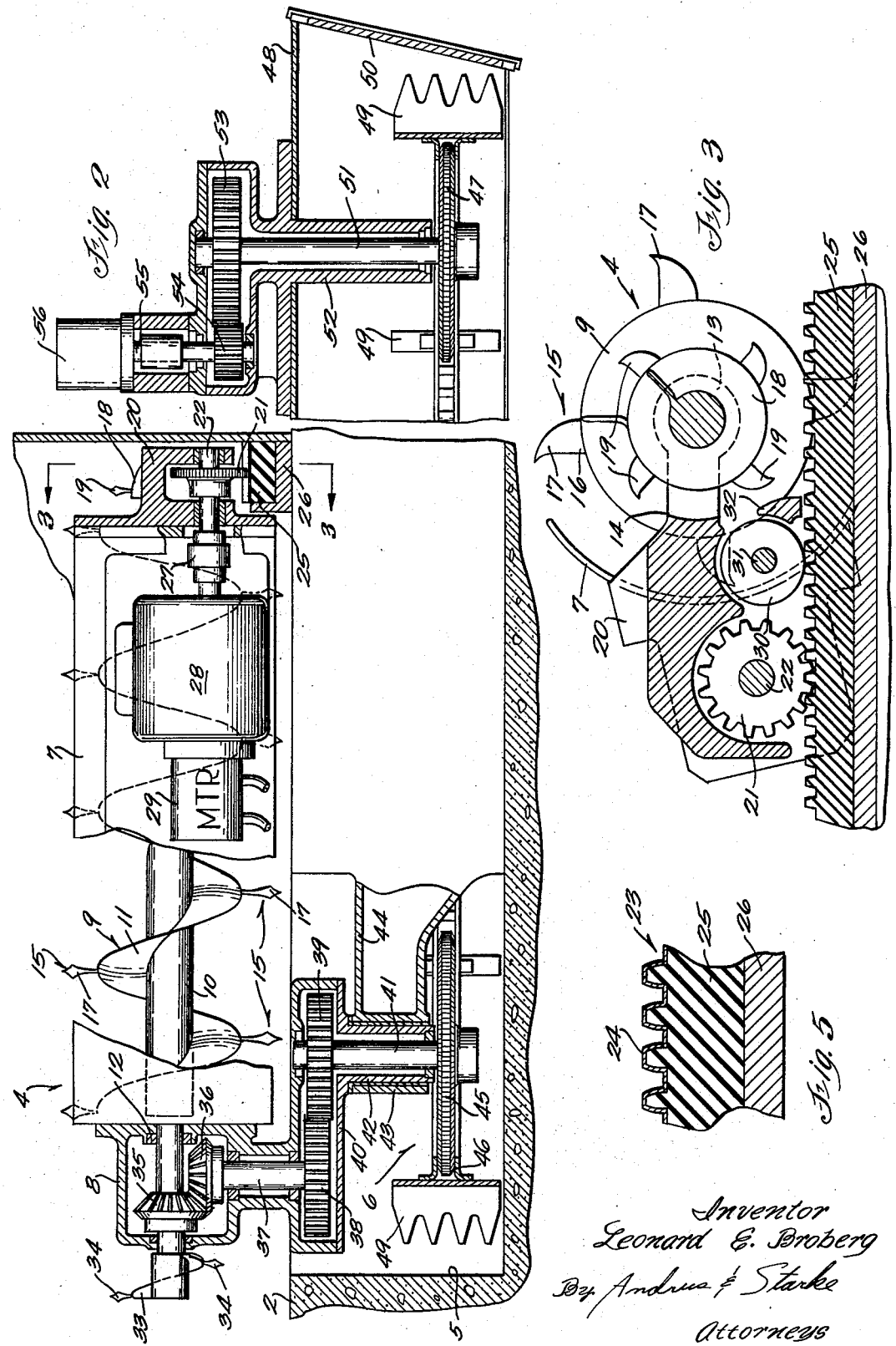

United States Patent Office 3,499,556
Patented Mar. 10, 1970

3,499,556
HYDRAULIC UNLOADING MECHANISM FOR A
STORAGE STRUCTURE
Leonard E. Broberg, Milwaukee, Wis., assignor to A. O.
Smith Harvestore Products, Inc., Arlington, Ill., a corporation of Delaware
Filed July 3, 1967, Ser. No. 650,686
Int. Cl. B65g 65/46
U.S. Cl. 214—17                                10 Claims

ABSTRACT OF THE DISCLOSURE

The invention relates to a hydraulically actuated unloading mechanism for unloading stored material from a sealed storage structure. The unloading mechanism comprises a cutter arm journalled for rotation about the center of the structure, and the cutter arm includes an auger having a series of teeth adapted to penetrate and dislodge the stored material as the arm rotates. The arm is driven from its outer end by a hydraulic motor carried by the arm.

---

Perishable materials such as silage are frequently stored in a sealed vessel or silo to minimize spoilage. As the silo is sealed to the atmosphere, a bottom unloading mechanism is normally employed to undercut and remove the silage, as disclosed in U.S. Patent 2,635,770 to Tiedemann. The conventional unloading mechanism includes a cutter arm which is journaled for rotation about a vertical axis at the center of the silo and the cutter arm carries an endless cutter chain which dislodges and moves the silage toward the center of the silo where it falls into a radially extending trough formed in the foundation. A conveying mechanism operates within the trough to convey the dislodged silage to the exterior of the silo.

In the conventional unloading mechanism, a motor is located on the exterior of the silo and operates through a mechanical drive system located in the trough to rotate the cutter arm around the silo. In addition, the motor drives a sprocket which carries the conveyor chain and the conveyor chain is operably connected to the cutter chain so that the movement of the conveyor chain acts to drive the cutter chain in its endless path on the rotating cutter arm.

During the unloading operation, various load conditions may be encountered due to localized areas of hard packed silage. In the conventional unloading mechanism there is no provision for adjusting the speed of rotation of the cutter arm, nor for adjusting the speed of the cutter chain, under varying load conditions.

The present invention is directed to an improved unloading mechanism for a sealed storage structure which incorporates a hydraulic drive system. According to the invention a cutter arm is journalled for rotation at the center of the silo and is adapted to dislodge the stored material as it rotates within the silo and convey the silage to the center of the silo where the dislodged silage falls into a radially extending trough. A conveyor unit operates within the trough to convey the silage to the exterior of the silo.

The cutter arm includes a frame and an auger is journalled in the frame and extends from adjacent the center of the silo to the periphery. A series of teeth having pointed tips and enlarged heads are secured to the outer periphery of the auger flighting and serve to penetrate and dislodge the silage as the auger is rotated about its axis.

To drive the cutter arm around the silo, a sprocket is located at the outer end of the cutter arm and is engageable with the teeth on a circular track which is mounted on the floor of the structure adjacent the silo wall. The sprocket is driven by a hydraulic motor connected through a gear reducer to the sprocket. The hydraulic motor, as well as the gear reduction unit, are mounted on the auger frame adjacent the outer end of the cutter arm. The hydraulic motor serves to rotate the sprocket which thereby drives the cutter arm in a rotary path around the silo.

The endless conveyor which operates in the radially extending trough is driven by a second hydraulic motor mounted on the conveyor housing on the exterior of the silo and movement of the conveyor is transmitted through a gear train located at the center of the silo to rotate the auger about its axis as the cutter arm rotates within the silo.

In operation, the cutter arm rotates within the silo and simultaneously the auger is rotated about its axis to dislodge the silage or other stored material and convey the dislodged material to the center of the silo where it falls into the radially extending trough. The conveyor unit operating within the trough then conveys the dislodged material to the exterior of the silo.

With the use of the hydraulic drive system, the speed of the rotation of the cutter arm is automatically varied with changes in the load. Moreover, the hydraulic drive system has a reduced starting torque requirement over that of a conventional mechanical drive system. Normally an electric motor specifically designed for high starting torque is used in the mechanical unloader, as the load has to be picked up immediately. With the hydraulic drive system the high torque starting characteristics are not required and a standard electric motor can be used for operating the hydraulic pump.

As a further advantage the hydraulic drive system provides a longer service life than a mechanical system due to the cushioning effect provided by the hydraulic drive. Furthermore, the hydraulic drive will reduce shock loads, and this is an important factor in that shock loads which are encountered in unloading silage or other hard pack materials cause rapid fatiguing of the drive elements.

The hydraulic drive system is capable of increased delivery due to the fact that under light loads the mechanism can operate at higher speed. In contrast to this, a mechanical unloader operates at a constant speed which is normally set for heavy load conditions and the mechanical unloader cannot take advantage of light load conditions to increase the speed of delivery. However, with the hydraulic drive system of the invention the speed of rotation of the auger is increased under light load conditions so that overall the delivery is improved.

As a further advantage the hydraulic drive system eliminates many of the expensive bevel gear sets, shafts and bearings which are present in the mechanical drive system and reduces maintenance costs, as there are fewer mechanical parts exposed to corrosion and wear.

Other objects and advantages will appear in the course of the following description.

The drawings illustrate the best mode presently contemplated of carrying out the invention.

In the drawings:

FIG. 1 is a side elevation of a silo with parts broken away in section and incorporating the hydraulic unloading mechanism of the invention;

FIG. 2 is an enlarged fragmentary, vertical section showing the unloading mechanism and the hydraulic drive;

FIG. 3 is a section taken along line 3—3 of FIG. 2;

FIG. 4 is a diagrammatic view of the hydraulic system; and

FIG. 5 is an enlarged vertical section taken through the track.

The drawings illustrate a silo or sealed storage structure 1 adapted to contain a stored material such as silage or other food products. The silo 1 is supported on the foundation 2 and an unloading mechanism 3 is mounted on the foundation and is adapted to undercut and dislodge the stored material and move it to the exterior of the silo.

The unloading mechanism in general includes a cutter arm 4 journalled for rotation about the center of the silo and adapted to dislodge the silage and move the dislodged silage to the center of the silo where it falls into the central portion of a radially extending trough 5 formed in the foundation 2. A conveying unit 6 operates within the trough to move the dislodged silage to the exterior of the silo.

As best shown in FIG. 2, the cutter arm 4 includes a frame 7 which is connected at its inner end to a central gear housing 8, and an auger 9 is coextensive with the frame 7 and is mounted for rotation about its axis. The auger 9 extends from the housing 8 to adjacent the wall of the silo 1 and includes a shaft 10 and a spiral flight 11 which is secured to the shaft. The inner end of shaft 10 is journalled for rotation within a pair of bearings 12 mounted in opposite walls of the central housing 8, while the outer end of the auger shaft is journalled within a bearing 13 carried by a bearing support 14 which extends laterally from the cutter arm frame 7.

To dislodge the silage or other stored material, a series of teeth 15 are secured to the outer periphery of the spiral flight 11. As best shown in FIGS. 2 and 3, the teeth 15 are each provided with a generally thin body portion 16 having a sharpened leading edge in the direction of rotation. The outer end of each tooth is provided with an enlarged, generally diamond-shaped head 17 which tapers to a sharpened tip. The teeth generally extend within planes disposed normal to the axis of auger shaft 10 and the sharpened tip of the tooth is adapted to penetrate the hardly packed silage while the enlarged head 17 serves to rip through and dislodge the silage.

Located outwardly of the outer bearing support 14 is a second auger 18 having a smaller diameter than the main auger 9 and carrying a series of teeth 19 similar to teeth 15, which are adapted to cut and dislodge the silage located adjacent the wall of the silo.

The cutter arm 4 is adapted to be driven around the silo by a drive mechanism operably connected to the outer end of the cutter arm. More specifically, a generally U-shaped housing member 20 is secured to the frame 7 and a drive sprocket 21 is mounted on a shaft 22 and is located within a recess in the housing 20. Shaft 22 is journalled for rotation within a pair of bearings which are mounted in the spaced walls of the housing 20 bordering the recess.

Sprocket 21 is adapted to engage the teeth of a generally circular track 23 which is mounted adjacent the wall of the silo. As best shown in FIG. 3, the track 23 includes an outer metal facing 24 mounted on an annular resilient base member 25 formed of rubber or plastic, and the base 25 in turn is mounted on a metal support member 26 which rests on the foundation 2. The rubber base 25 for the metal facing 24 provides a degree of resiliency which permits the facing to deflect under load and prevents binding of the drive mechanism due to packed silage in the teeth of the track or due to the load of the silage bearing down on the top of the cutter arm.

To drive the sprocket 21, a coupling 27 connects the shaft 22 and the output shaft of a gear reduction unit 28 which is driven by a hydraulic motor 29, as shown in FIG. 2. Both the gear reduction unit 28 and hydraulic motor 29 are mounted on the frame 7 of the cutter arm adjacent the outer end of the cutter arm. Hydraulic fluid is supplied and returned from the hydraulic motor 29 through hydraulic lines which extend inwardly along the frame 7 to the center of the silo and are connected to stationary supply lines by a conventional hydraulic swivel coupling, not shown.

The drive sprocket 21, as best shown in FIG. 3, is located to the rear of the outer auger 18 so that the auger 18 serves to dislodge the stored material ahead of the drive sprocket 21 and thereby enables the cutter arm to move smoothly around the silo.

In order that the weight of the cutter arm is not borne solely by the sprocket 21, a wheel 30 is mounted on shaft 31 which is journalled between the spaced walls of the housing 20, and wheel 30 rides on the track 23 ahead of the sprocket 21. To clean the track ahead of the wheel 30, the housing 20 is provided with a blade section or plow 32 which extends downwardly beneath the lower edge of the housing and ahead of the wheel. The plow 32 serves to scrape the stored material from the track and enables the wheel 30 and sprocket 21 to move smoothly over the track.

As best shown in FIG. 2, the inner end of the auger shaft 10 projects beyond the housing 8 and carries auger 33 having a series of teeth 34 which correspond generally to the teeth 15 on auger 9. As the cutter arm 4 rotates, the teeth 34 will also penetrate to dislodge the stored material on the opposite side of the housing 8 to loosen the mass of material adjacent the center of the silo.

To rotate the augers 9 and 33 about their axes, a bevel gear 35 is secured to auger shaft 10, and gear 35 meshes with a bevel gear 36 mounted on the upper end of vertical shaft 37. The lower end of shaft 37 carries a spur gear 38 which is driven by a spur gear 39. Gears 38 and 39 are located within a casing 40 mounted within the central portion of the trough 5.

Spur gear 39 is mounted on the upper end of a shaft 41 which extends downwardly within a sleeve 42 formed integrally with the casing 40. Sleeve 42 is mounted for rotation within a central hub 43 supported by a mounting structure 44 located within the trough 5. As the shaft 41 rotates, the gear 39 drives the gear 38, and rotation of gear shaft 37 acts through bevel gears 36 and 35 to rotate the auger 10 about its axis. As the cutter arm 4 is simultaneously driven by motor 29 about the central axis of the silo, which coincides with the axis of shaft 41, the casing 40, gear 38 and housing 8 are all moved in a circular path about the axis of shaft 41.

The shaft 41 is rotated by movement of the conveyor unit 6. Conveyor unit 6 includes a sprocket 45 connected to the lower end of the shaft 41 and a chain 46 connects the sprocket 45 with a drive sprocket 47 located within the conveyor housing 48 secured to the exterior of the silo. A series of paddles 49 are connected at spaced intervals to the chain 46, and as the chain moves in its endless path of travel within the trough 5 and housing 48, the paddles 49 convey the loosened silage within the trough to the housing 48 where it is discharged through a door 50 in the outer end of the housing.

The drive sprocket 47 is mounted on the lower end of a vertical shaft 51 which is journalled for rotation within a gear housing 52. The upper end of shaft 51 carries a gear 53 which is engaged with a gear 54 mounted on drive shaft 55 of hydraulic motor 56. Thus, rotation on the drive shaft 55 serves to rotate the drive sprocket 47 and thereby drive the conveyor chain 46 in an endless path of travel to convey the silage or other stored material to the housing 48 where it is discharged through door 50.

A reservoir 57 of hydraulic fluid is located within the conveyor housing 48 between the parallel paths of travel of the endless conveyor chain 46. The reservoir 57 is defined by a pair of generally parallel plates 58 which extend parallel to the side walls 59 of housing 52 and by a pair of transverse plates 60 which extend between the longitudinal plates 58. The space between the longitudinal plates 58 and the corresponding side walls 59 of the housing 52 provides a passage for travel of the conveyor chain 46.

An inlet conduit 61 extends downwardly into the reservoir 57 and is connected to the inlet of a pump 62 mounted on the upper surface of housing 52. Pump 62 is driven by an electric motor 63.

Operation of the hydraulic motor 29 serves to rotate the drive sprocket 21 to thereby rotate the cutter arm 4 within the silo, while operation of the hydraulic motor 56 serves to drive the conveyor unit 6 and this movement is transmitted through the gear train to rotate the auger 9 about its axis. As the auger 9 rotates, the teeth 15 penetrate and dislodge the stored material and the spiral flight 11 conveys the dislodged material to the center of the silo where it falls into the central portion of trough 5. The paddles 49 of the conveyor unit 6 convey the dislodged material within the trough to the conveyor housing 48 where the material is discharged through the door 50 to the exterior.

The hydraulic system is shown diagrammatically in FIG. 4. The pump 62 is driven by motor 63 and hydraulic fluid is supplied to the pump through line 64 from reservoir 65. The pump includes a series of pistons which are indicated by A, B, C, D, E, and F. The discharge lines from pistons A, B, C, D and E are connected to the hydraulic motor 56 to drive the chain 46 while the discharge from piston F is connected to the hydraulic motor 29 to drive the cutter arm.

Discharge lines 66, 67 and 68 connect pistons A, B, and C, respectively, to hydraulic motor 56 through line 69. Discharge line 70 is connected to the piston D and check valve 71 is located in line 70 and permits the flow of fluid to the line 69 and motor 56, but prevents the flow of fluid in the opposite direction. Piston E is connected by line 72 to line 69 and a check valve 73, similar to check valve 71, is located in line 72.

Dump valves 74 and 75 communicate with the lines 70 and 72, respectively, and the dump valves are loaded to predetermined and different pressures, and when the pressure of the fluid in the lines 70 and 72 exceeds the setting of the corresponding dump valve, the valve will open to discharge the fluid to the reservoir 65. Dump valves 74 and 75 are connected through pilot lines 76 and 77, respectively, to the supply line 69.

A pressure relief valve 78 is connected to line 69 and when the pressure in line 69 exceeds the setting of relief valve 78, the valve will open to vent the fluid through line 79 to reservoir 65.

The valves 74, 75 and 78 are set for different relieving pressures. For example, the setting of valve 75 can be set for 750 p.s.i., while the setting of valve 74 can be for 1500 p.s.i. In addition, relief valve 78 is set for a higher maximum pressure, as for example 3,000 p.s.i. As the load on the cutter chain increases, the pressure of the hydraulic fluid correspondingly increases and when the pressure exceeds the 750 p.s.i. setting of valve 75, the valve will open and the hydraulic fluid will then flow through the valve 75 to the reservoir 65. When this occurs, hydraulic fluid is then being supplied through pistons A, B, C and D to the hydraulic motor 54, and the speed of the motor will be ⅘ of its maximum speed. If the load increases further and the pressure of the hydraulic fluid exceeds the setting of valve 74, valve 74 will then open to by-pass the hydraulic fluid to the reservoir 65. When valve 74 opens, hydraulic fluid will then be supplied to the motor 54 through lines 66, 67 and 68, and the speed of the motor will thus be ⅗ of the maximum speed. Thus the construction provides an automatic variation of load. As the load increases, the speed will be reduced, and conversely as the load decreases, the speed of the cutter chain will be increased.

While the hydraulic system shown has a series of five pistons A–E which supply hydraulic fluid to the motor 56, it is contemplated that any number of pistons can be used with the greater number of pistons providing the greater incremental variation in speed for the motor under varying load conditions.

As previously mentioned, the piston F of pump 62 supplies hydraulic fluid for operation of the cutter arm 4 and a discharge line 80 is connected between the piston F and the motor 29. A check valve 81 is located in line 80 and prevents flow of fluid from the motor 28 back to the pump 62. A pressure relief valve 83 is connected by line 84 to supply line 80 and a pilot line 85 connects the valve with line 80. If the pressure in the line 80 exceeds a predetermined value, the relief valve 83 will open to bypass the fluid through line 85 to the reservoir.

The hydraulic drive mechanism of the invention has the advantage of automatically varying the speed of rotation of the auger 9 with variations in load conditions. For example, as the load increases when the auger engages the hard packed area, the speed will decrease, and as the load decreases the speed of travel of the auger will increase. This not only reduces the power requirements, but increases the overall delivery rate of the unloader.

The cushioning effect of the hydraulic drive also reduces the shock loads on the unloader and substantially increases the service life of the unloading mechanism.

I claim:

1. An unloading mechanism for unloading stored material from a storage structure, comprising a material dislodging arm mounted for rotation about the center of the storage structure and comprising a frame, an auger mounted for rotation on the frame, a series of teeth connected to the auger and adapted to penetrate and dislodge the stored material as the auger is rotated; a drive member mounted on the outer end of the arm; a generally circular track located adjacent the wall of the structure and disposed to be engaged by said drive member; first hydraulic drive means including a hydraulic motor mounted on the frame adjacent the outer of the arm and operably connected to the drive member to move the drive member along said track and thereby rotate the arm within the storage structure to dislodge the stored material; a second hydraulic motor located on the exterior of the storage structure; gear means located adjacent the center of the structure and connected to the inner end of said auger; interconnecting means for interconnecting the hydraulic motor and said gear means; and discharge means for discharging the dislodged material from said structure, said interconnecting means comprising at least a portion of said discharge means.

2. The unloading mechanism of claim 1, in which the storage structure includes a foundation having a radially extending trough formed in the upper surface of the foundation and extending from the center of the structure to the exterior, said discharge means including an endless conveyor operating within said trough and said endless conveyor comprising said connecting means.

3. An unloading mechanism for unloading stored material from a storage structure, comprising a material dislodging arm mounted for rotation about the center of the storage structure and including a frame, an auger mounted for rotation on the frame and having one end located adjacent the periphery of said structure and the other end disposed beyond the center of said structure, a series of teeth connected to the auger and adapted to penetrate and dislodge the stored material as the auger is rotated; means for revolving the arm about the center of the storage structure, said storage structure comprising a foundation having a radially extending trough disposed in the upper surface thereof; discharge means disposed within the trough for discharging the dislodged material from said structure and including an endless conveying member; support means engaged with the conveyor member and mounted for rotation about an axis aligned with the center of the storage structure; and gear means including a first gear operably connected to said support means and disposed axially of said storage structure, a second gear connected to said auger shaft, and a series of gears interconnecting said first and second gear, said series of gears disposed out of alignment with said axis and disposed to revolve around said axis as said cutter arm revolves within the storage structure.

4. An unloading mechanism for unloading stored material from a storage structure, comprising a material dislodging arm mounted for rotation about the center of the storage structure, a drive member located on the outer end of said arm, generally circular track located adjacent the wall of the storage structure and beneath the drive member and disposed to be engaged by said drive member, said track including an outer metal facing member and a resilient backing member and having a series of projections to be engaged by said drive member, drive means mounted on said arm and operably connected to the drive member to move said drive member along said track and thereby rotate said cutter arm within the storage structure to dislodge the stored material, and the discharge means for discharging the dislodged material from said structure.

5. The mechanism of claim 4, wherein said drive member is a sprocket and said track is provided with a plurality of upstanding teeth to be engaged by said sprocket.

6. The mechanism of claim 3, and including a second auger disposed in alignment with the first auger and extending in the opposite direction from the first auger, said second gear being connected to said second auger to drive said second auger in accordance with rotation of said first auger.

7. The mechanism of claim 4, and including a material dislodging member carried by the outer end of the arm and located ahead of the drive member in the direction of rotation of said arm, said material dislodging member being rotatable about a horizontal axis and located above the track, and means for rotating said material dislodging member about said horizontal axis.

8. The mechanism of claim 7, wherein said material dislodging member is a second auger.

9. The mechanism of claim 8, wherein the second auger is disposed in axial alignment with the first auger and has a substantially smaller outer diameter than said first auger.

10. An unloading mechanism for unloading stored material from a storage structure, comprising a material dislodging arm mounted for rotation about the center of the storage structure, a drive member located on the outer end of said arm, a generally circular track located adjacent the wall of the storage structure and beneath the drive member and disposed to be engaged by said drive member, said track including a resilient backing member having a series of upwardly extending teeth and an outer metal facing member covering said teeth, drive means mounted on said arm and operably connected to the drive member to move said drive member along said track and thereby rotate said cutter arm within the storage structure to dislodge the stored material, and discharge means for discharging the dislodged material from said structure.

References Cited
UNITED STATES PATENTS

| | | | |
|---|---|---|---|
| 2,652,785 | 9/1953 | Cox | 105—29 |
| 3,417,880 | 12/1968 | Broberg. | |
| 2,711,834 | 6/1955 | Broberg et al. | |
| 3,237,788 | 3/1966 | Weaver et al. | |
| 3,282,446 | 11/1966 | Laidig. | |
| 3,289,862 | 12/1966 | Weaver et al. | |
| 3,335,955 | 8/1967 | Palfreyman | 238—283 |
| 3,356,235 | 12/1967 | Laidig. | |

ROBERT G. SHERIDAN, Primary Examiner

U.S. Cl. X.R.

238—123, 283